Nov. 22, 1960    N. CORDIS    2,960,965
POULTRY WATERER WITH AUTOMATIC CLEANER
Filed Oct. 18, 1956    2 Sheets-Sheet 1
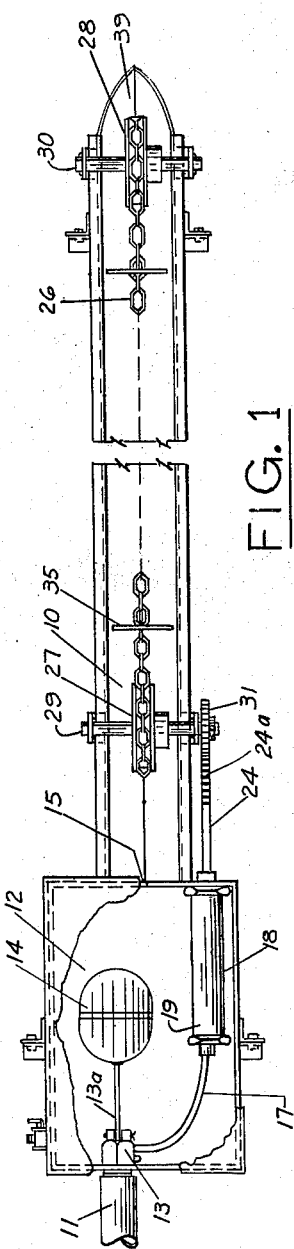
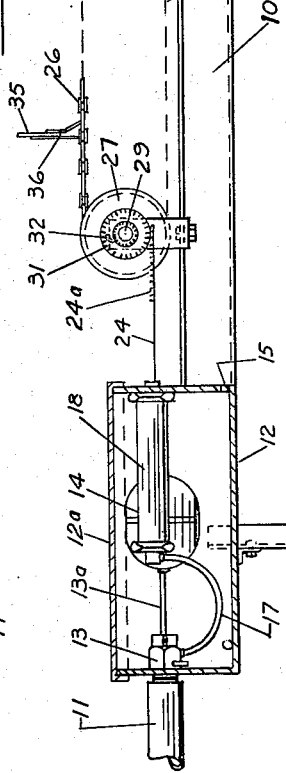
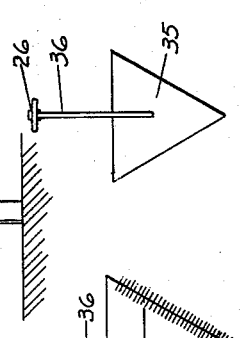
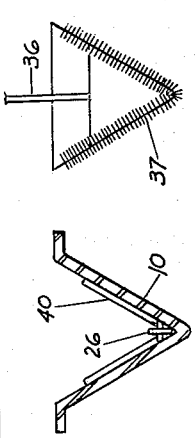
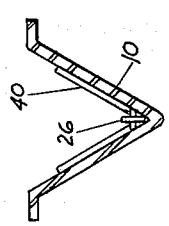
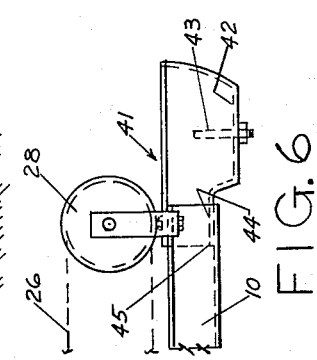
INVENTOR
NAT CORDIS
BY *Everett A. Johnson*
ATTORNEY Nov. 22, 1960 N. CORDIS 2,960,965
POULTRY WATERER WITH AUTOMATIC CLEANER
Filed Oct. 18, 1956 2 Sheets-Sheet 2
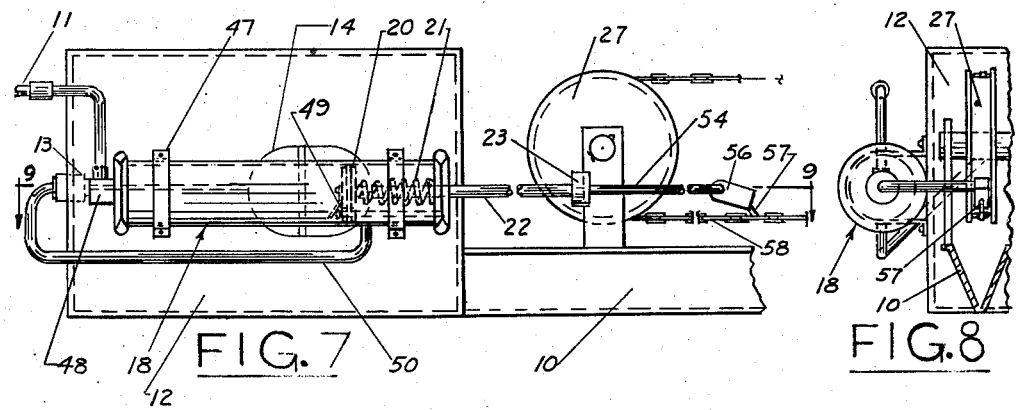
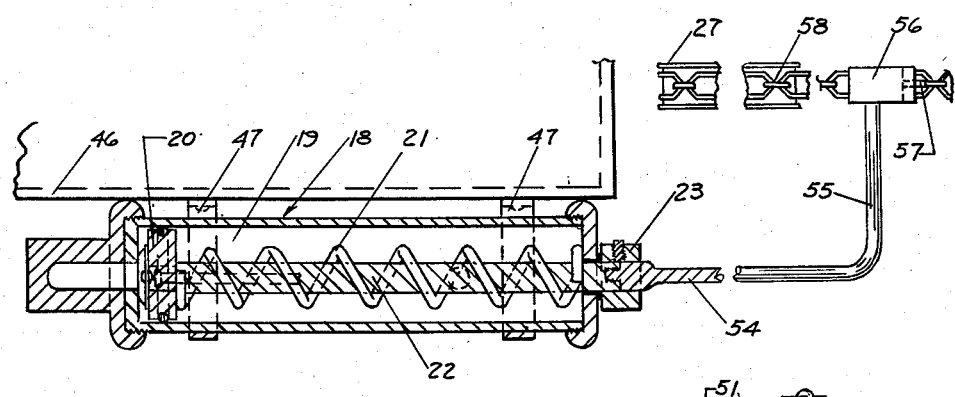
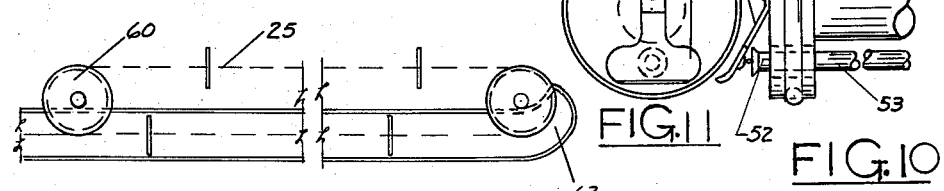
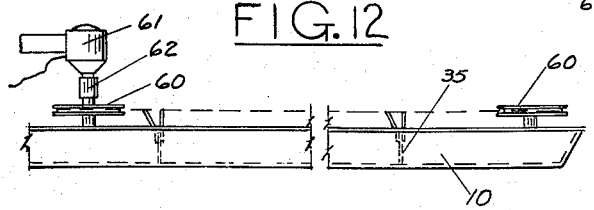
INVENTOR
NAT CORDIS
BY *Everett A. Johnson*
ATTORNEY

United States Patent Office 2,960,965
Patented Nov. 22, 1960

2,960,965

POULTRY WATERER WITH AUTOMATIC CLEANER

Nat Cordis, Crown Stock Farm, Silver Lake, Wis.

Filed Oct. 18, 1956, Ser. No. 616,825

3 Claims. (Cl. 119—78)

This invention relates to improvements in animal husbandry and, in particular, to a watering trough for poultry.

Poultry waterers of the type to which this invention is directed include a trough to which is connected a source of water and a predetermined level or quantity is maintained in the trough by a valve which is controlled in response to the water in the trough at any particular time. This may, for example, be done by a float-operated valve positioned by the depth of the water or by changes in the weight of the trough and water due to the changes in the depth of water.

In use, a considerable quantity of refuse, including litter, earth and manure, may collect within the trough, some of which is deposited on the bottom thereof and some of which floats on the water and tends to adhere to the sides of the trough when the water level is lowered. Since it is desirable to have clean water, this refuse must be removed at frequent intervals.

In addition to avoiding accumulations of this sort, it is also desirable to move the water within the trough since moving water attracts the birds and they drink more water which is beneficial. Heretofore, no satisfactory system has been available which does these things in a simple and fool-proof manner. In fact, heretofore, it frequently has been necessary to dismantle the trough assembly in order to remove accumulations and sometimes flowing water continuously through the trough has been tried to provide the moving water.

It is, therefore, a primary object of this invention to provide a self-cleaning watering trough for poultry so that the accumulations are automatically removed from the trough. Another object is to provide a self-cleaning watering trough which is positive acting and which will remove all foreign matter in response to the consumption of water from the trough. A further object is to avoid the necessity of in any way interrupting the watering operation when it is desired to clean the waterer.

A further object of the invention is to provide an apparatus which does not require any dismantling of the trough installation to clean it and which does not require any wasting of water to effect the cleaning. Still another object of the invention is to provide a system whereby the trough is, at all times, kept free of any foreign matter. Another object of the invention is to provide a watering device which may be automatically maintained in a sanitary and clean condition. A more specific object is to provide a mechanism which maintains the predetermined level of water in the trough and which automatically controls the actuation of a mechanical cleaner within the trough. An additional object is to provide a float-actuated mechanism and a hydraulic relay for moving the cleaner within the trough. These and other objects of my invention will become apparent as the description thereof proceeds.

Briefly, according to my invention, I provide a poultry waterer, of the type including an open-topped trough having valve means for controlling flow of water into the trough, with a cleaner means adapted to travel along the trough and with propelling means controlled by the valve means for driving the cleaner. Hydraulic relay or booster means having a mechanical displacement of an element such as a piston, a diaphragm, or an expansion bellows, drives the cleaning element which moves along the trough and ejects the refuse therefrom with a minimum water loss. It will be understood that adjustable legs for the trough assembly can be provided and that the trough may be inclined downwardly from the inlet toward the remote end which may include an overflow outlet.

Further details and advantages of the apparatus will be described by reference to preferred embodiments thereof illustrated in the drawings and wherein:

Figure 1 is a plan view, partly in section, of an apparatus embodying my invention;

Figure 2 is an elevation, partly in section of the apparatus shown in Figure 1;

Figures 3, 4, and 5, illustrate forms of paddles, brushes, and scrapers, respectively, which may be used in the apparatus of Figures 1 and 2;

Figure 6 is a fragmentary elevation of a sump and overflow attachment;

Figures 7 and 8 are enlarged side and end views, respectively, of another form of cleaner actuator for converting existing waterers to the automatic cleaner type;

Figure 9 is an enlarged fragmentary view taken along the lines 9—9 in Figures 7 and 8, partly in section, of one type of hydraulic relay;

Figures 10 and 11 show details of a piston-valve system for use in the relay of Figure 9 in enlarged scale; and Figures 12 and 13 are schematic elevation and plan view, respectively, of another embodiment of the invention.

Referring to the drawings, the waterer includes a trough 10, water inlet line 11, float chamber 12, valve 13 controlling the flow of water from inlet 11 into chamber 12, operating lever 13a, and float 14 carried by the lever 13a. The water supplied by inlet 11 accumulates in chamber 12 until the predetermined depth of water in trough 10 is reached, the water flowing into trough 10 via flow port 15 in a wall of chamber 12. It will be appreciated, however, that the chamber 12 and the port 15 may be omitted when one end of the trough 10 itself is used to accommodate the float 14. If desired, an overflow 16 can be provided, preferably at a point remote from the inlet valve 13.

The valve 13 controls the flow of water into the chamber 12 or the trough 10 in response to the position of the float 14 as determined by the depth of water. However, in addition, the valve 13 controls the application of water pressure by line 17 to the hydraulic relay 18 comprising in the illustrated embodiment a cylinder 19, piston 20, spring 21 and shaft 22 with its stop 23. Upon the application of pressure to the piston 20 by the admission of water to line 17 and cylinder 19 through float-controlled valve 13, the piston 20 is displaced and moves the shaft 22 outwardly of the cylinder 19. Simultaneously, water from inlet 11 is introduced into the chamber 12 by valve 13. When the float 14 rises in chamber 12, the valve 13 closes thereby stopping the flow of water through the valve 13 and discontinuing the application of pressure on piston 20 in cylinder 19.

When this condition obtains, the spring 21 expands within cylinder 19 to restore the initial position of piston 20 and expel water from the cylinder 19 through line 17 and valve 13 into chamber 12. The shaft 22, being fixed to the piston 20, is thereby retracted until stop 23 engages the end of cylinder 19 through which the shaft 22 is operated. A drive bar 24, carried by shaft 22, is thereby oscillated to and fro by the alternate displacement of the piston 20 by the pressure of water supplied to the cylinder 19 and by the expanding action of the spring 21 when such pressure is removed.

The cleaner 25 includes a flexible conveyer 26, which may be an endless cable or chain, trained about pulleys 27 and 28 supported on the axles 29 and 30. These axles in turn can be supported by frame members (not shown) which can double as supports or legs for the trough assembly.

A gear 31, arranged to drive axle 29 in one direction only, is turned by the rack 24a on drive bar 24 which is an extension of drive shaft 23. Pawl means 32 permits the unidirectional rotation of the pulley 27. However, if desired, the drive bar 24 may be pivotally linked through a pitman (not shown) to the axle 29 whereby the cleaner 25 can be caused to travel along the trough 10 on each forward movement of the bar 24. In the illustrated embodiment, the bar 24 is flexible and the rack 24a is held snugly against the teeth of the gear 31.

In addition to the conveyor 26, the cleaner 25 includes spaced paddles 35 illustrated as conforming to the cross-sectional pattern of the trough 10 which may be triangular, rectangular, rhombic, semi-circular, and the like. The paddles 35, whatever their shape, are connected by flexible arms 36 fixed to the chain conveyor 26 to extend generally transverse to the chain 26 and to the trough 10. One or more of the paddles 35 may comprise a brush element 37 such as shown in Figure 4. Also, the imperforate paddles 35 may be perforated or slotted, or may comprise screens or expanded metal sheet, to give a strainer action. The paddles discharge at the terminal end 38 of the trough 10 which includes ramp 39 having the cross-sectional configuration of the paddles carried by the chain 26.

In some instances, it will be desirable to include one or more paddles comprising the flexible scraper blade 40 made of flexible spring stock and adapted to conform to the shape of the trough when passing therethrough, the arms of the scraper 40 expanding into contact with the trough walls as shown in Figure 5.

Referring to Fig. 6, I provide a sump-overflow unit 41 which can be mounted at one end of the trough 10. It includes a sump 42, an overflow 43 if desired, and an integral channel 44, conforming to the shape of and telescoped within the end of the trough 10. The edge 45 of the channel 44 snubs each paddle 35 and "snaps" refuse into the removable sump unit 41.

A pin 36a may be provided at some convenient place, such as near the ramp 39, momentarily to retard travel of the arm 36 and "snap" the paddle 35 to eject any refuse which might otherwise adhere to the paddle 35.

In some instances, as shown in Figure 5, it may be desirable to cause the chain 26 to travel along the bottom of the trough 10 and, if desired, expandable paddles 40 can be carried by the chain 26, such paddles 40 expanding into a shallow V or straight bar which does not interfere with the travel of the conveyor element 26 about the pulleys 27 and 28. In such a paddle array, the pulley 27 or the chain 26 itself can be engaged by the driving means.

The valve 13, the lever 13a, the float 14 and water inlet 11, together with the hydraulic relay 18, can all be arranged in a subassembly on the cover 12a of the chamber 12. However, it is contemplated that the chamber 12 may itself support the sub-assembly. Likewise, the relay 18 can be mounted outside the chamber 12 with impulse line 17 making the connection between inlet 11 and cylinder 19.

The drive power of the relay 18 can be enhanced by diverting the entire flow from valve 13 into line 17. In that event, the cylinder 19 is provided with a vent line discharging into the float chamber 12, the vent being opened by the full displacement of the piston 20. This permits the use of lower pressure supply streams for effectively driving the cleaner 25.

Another system is illustrated in Figures 7 to 11, inclusive. This embodiment also utilizes a different type of chain drive and flows all the water through the relay 18. The relay 18 can be mounted adjacent the cleaner assembly 25, such as on the outer wall 46 of the float chamber 12 by means of brackets 47 or the like. The water supply line 11 is connected to the inlet coupling 48 at one end of the relay 18. The water flows into the cylinder 19 within the relay 18 and forces the piston 20 toward the remote end of the relay 18 against the action of spring 21. A check valve means 49 is actuated when the piston 20 moves toward the delivery duct 50. The water flow is then through the check valve 49, and from the chamber 19 via delivery duct 50 when discharges through the level-controlled valve 13 and into the float chamber 12 or directly into the trough 10, as described above.

Figures 10 and 11 illustrate the details of one form of check valve 49 on piston 20. A spring mount 51 is linked to valve plug 52 to which the valve rod 53 is secured and passes through the port in piston 20. When the rod 53 contacts the end of the chamber 19, the check valve is held open against the pressure of water in 19. When the flow of water from the chamber 19 via duct 50 is checked by the inlet valve 13, the spring 21 takes over (the check valve 49 equalizes the pressures on both sides of the piston 20) and moves the piston 20 rearwardly of the chamber 19. The water trapped within the cylinder flows freely through the open check valve 49 as the piston 20 moves rearwardly.

On each cycle of the relay 18, the arm 54 is pushed forward and then retracted. In the embodiment of Figures 7, 8, and 9, the arm 54, secured to the shaft 23, is provided with an outrigger 55 which supports the pivoted block 56 having the angular chain-engaging pin 57 for entering the flat open links in the chain 58. As the water flows into the chamber 19, the piston 20 moves forward and causes the arm 54, the block 56, and pin 57 to push the chain 58 along the trough to carry the paddles 35 along the trough 10.

When the spring 21 retracts the piston 20 by expanding, then the arm 54, the ratchet block or weighted pawl 56, and the pin 57 are also retracted and the pin 57 passes rearwardly over the chain 58 without moving it. On the next pass, the pawl 56—57 engages the chain 58 and again advances it within or along the trough 10. Thus on each advancing stroke of the relay 18, the chain 58 is moved forwardly about the pulleys 27—28 along the trough. On each retracting stroke the relay 18 merely withdraws the chain-engaging pin and block to cock the drive for the next advancing stroke.

In Figures 12 and 13, the pulleys 60 are mounted for rotation in a horizontal plane and the cleaner assembly 25 travels in a similar plane. A motor 61 drives the pulley 60 through a coupling 62, the motor 61 being controlled by a switch means (not shown) which is responsive to the level or weight of water in the waterer. Thus micro or mercury switches may be used. For example, a mercury switch on the lever arm 13a of the float 14 or a micro switch actuated by the position of the trough itself, etc. controls the drive period of the motor 61 and hence the movement of the cleaner assembly 25. It will be understood that such a drive can be applied to the trough and cleaner apparatus of Figures 1 and 2 in which event the relay 18 and the chain drives described there and in connection with Figures 7–9, can be omitted.

Although I have described my invention by reference to particular embodiments thereof, it should be understood that these are by way of illustration. Accordingly, it is contemplated that the above and other modifications in the apparatus and the mode of using the apparatus can be made without departing from the scope of the invention. For example, the hydraulic drive or relay can be used to actuate a medicator for a poultry waterer.

What I claim is:

1. A poultry waterer apparatus comprising an open-topped trough of V-shaped section, a water inlet chamber at a first end of said trough, a ramp merging with the second end of said trough comprising an upwardly inclined bottom portion thereof, a first pulley adjacent and above the first end of said trough, a second pulley adjacent and above the second end of said trough, said second pulley being arranged above the base of said ramp, an endless flexible conveyor means running about said pulleys along said trough, said conveyor means including a plurality of paddles having a portion which has substantially the configuration of the cross-section of said trough and ramp, said paddles running over the bottoms of said trough and of said ramp, and means for propelling said conveyor means and paddles in one direction through and along said trough and up and out of said ramp, successively.

2. The apparatus of claim 1 wherein said endless flexible conveyor means comprises an endless open-link chain, drive means for said chain comprising a reciprocating bar and a pawl carried by said bar over said chain, and means for reciprocating said bar, said pawl engaging and releasing links of said chain as the pawl is reciprocated along a length of said chain.

3. The apparatus of claim 1 wherein said means for propelling said conveyor means comprises a reciprocating water motor means, ratchet means in driving relationship to said first pulley, and reciprocating rack bar means engaging said ratchet means and actuated by said motor means to propel said conveyor means along said trough.

References Cited in the file of this patent

UNITED STATES PATENTS

| | | |
|---|---|---|
| 2,043,595 | Raymond | June 9, 1936 |
| 2,522,449 | Inman | Sept. 12, 1950 |
| 2,529,777 | McInnis | Nov. 14, 1950 |
| 2,701,548 | Wolfe | Feb. 8, 1955 |
| 2,719,509 | Kitson | Oct. 4, 1955 |
| 2,771,058 | Howard | Nov. 20, 1956 |